(12) United States Patent
Ahuja et al.

(10) Patent No.: US 11,252,029 B1
(45) Date of Patent: Feb. 15, 2022

(54) SYSTEMS AND METHODS FOR CONFIGURING NETWORKS

(71) Applicant: Facebook, Inc., Menlo Park, CA (US)

(72) Inventors: Satyajeet Singh Ahuja, Saratoga, CA (US); Varun Gupta, Newark, CA (US); Vinayak Dangui, Santa Clara, CA (US); Soshant Bali, Sunnyvale, CA (US); Gayathrinath Nagarajan, Saratoga, CA (US); Petr V Lapukhov, New York, NY (US); Hao Zhong, Stanford, CA (US); Ying Zhang, Fremont, CA (US); Abishek Gopalan, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 17/317,153

(22) Filed: May 11, 2021

Related U.S. Application Data

(60) Provisional application No. 63/165,691, filed on Mar. 24, 2021.

(51) Int. Cl.
*H04L 12/24* (2006.01)
*H04L 12/801* (2013.01)
(Continued)

(52) U.S. Cl.
CPC ......... *H04L 41/0813* (2013.01); *H04L 41/06* (2013.01); *H04L 47/10* (2013.01)

(58) Field of Classification Search
CPC ...... H04L 41/0813; H04L 41/06; H04L 47/10
See application file for complete search history.

(56) References Cited

U.S. PATENT DOCUMENTS

| | | | |
|---|---|---|---|
| 2002/0187770 A1* | 12/2002 | Grover | H04L 45/62 |
| | | | 455/403 |
| 2005/0265258 A1* | 12/2005 | Kodialam | H04L 45/04 |
| | | | 370/254 |

(Continued)

OTHER PUBLICATIONS

Fard, Nasser S. "Cutset enumeration of network systems with link and node failures", 1999, Reliability Engineering and System Safety 65, pp. 1-6 (Year: 1999).*

*Primary Examiner* — Jonathan A Bui
(74) *Attorney, Agent, or Firm* — FisherBroyles, LLP

(57) ABSTRACT

The disclosed computer-implemented method may include (i) generating a data center constraint model by placing a constraint on a total amount of ingress or egress traffic a service expects from each respective data center of multiple data centers, (ii) filtering a set of traffic matrices that indicate points in the data center constraint model by comparing the set of traffic matrices against cut sets of a network topology that indicate network failures to create a tractable set of dominating traffic matrices, (iii) obtaining physical network resources to implement a cross-layer network upgrade architecture that satisfies the tractable set of dominating traffic matrices, and (iv) allocating the physical network resources across the multiple data centers according to the cross-layer network upgrade architecture such that a capacity level of the multiple data centers is increased while satisfying the data center constraint model. Various other methods, systems, and computer-readable media are also disclosed.

20 Claims, 10 Drawing Sheets

(51) Int. Cl.
*H04L 41/0813* (2022.01)
*H04L 47/10* (2022.01)
*H04L 41/06* (2022.01)

(56) References Cited

U.S. PATENT DOCUMENTS

| | | | | |
|---|---|---|---|---|
| 2008/0225717 | A1* | 9/2008 | Chen | H04W 28/02 370/235 |
| 2009/0303880 | A1* | 12/2009 | Maltz | H04L 45/24 370/235 |
| 2011/0225277 | A1* | 9/2011 | Freimuth | G06F 9/45558 709/223 |
| 2012/0127893 | A1* | 5/2012 | Binder | H04L 49/101 370/255 |
| 2017/0214634 | A1* | 7/2017 | Li | H04L 67/1008 |
| 2017/0346701 | A1* | 11/2017 | Perrett | H04L 41/145 |
| 2018/0102865 | A1* | 4/2018 | Li | H04Q 11/0005 |
| 2021/0067468 | A1* | 3/2021 | Cidon | H04L 41/12 |

\* cited by examiner

| MIN | $\sum_{M \in T} A_M$ |
|---|---|
| S.T. | $\sum_{M \in D(C)} A_M \geq 1, \forall C \in C$ <br> $A_M \in \{0,1\}, \forall M \in T$ |

FIG. 9

SYSTEMS AND METHODS FOR CONFIGURING NETWORKS

CROSS-REFERENCE TO RELATED APPLICATION(S)

This application claims priority to U.S. provisional application 63/165,691, filed Mar. 24, 2021, titled "SYSTEMS AND METHODS FOR CONFIGURING NETWORKS," which is incorporated by reference herein in its entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 9 is an integer linear programming formulation for filtering traffic matrices.

Figure 1:
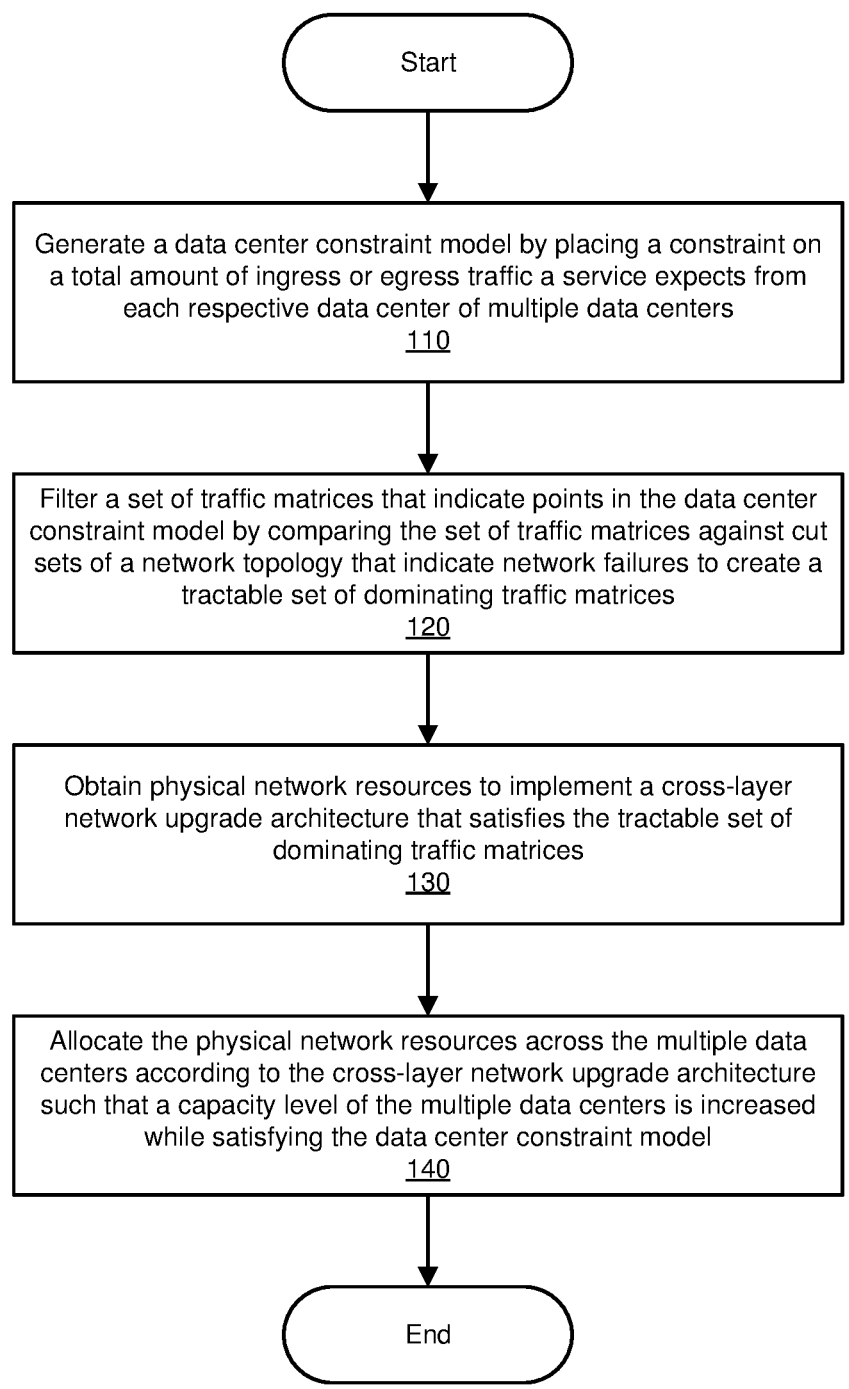
FIG. 1 is a flow diagram of an example method for configuring networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Modern technology companies often utilize large or global computing networks to provide one or more services to users or customers. For example, a social networking technology company may provide a global cross-layer backbone network between a multitude of data centers to provide such services. As illustrative examples, such services may include messaging services, photo storage services, and/or backend data analytics and database services. Nevertheless, the size and scale of such networks pose challenges when planning to ensure that the networks have sufficient capacity and resources to accommodate demand. For example, the size and scale of such networks may require a capacity planner to forecast three months to two years ahead of expected demand to properly anticipate and install network capacity upgrades.

Making forecasts so far ahead is inherently challenging and fraught with uncertainty. For example, predicting how different services evolve over time in production is difficult given the number of services that are supported. Moreover, possible traffic profile changes include service architecture changes, relabeling of Quality of Service (QoS) classes, traffic shifts for load-balancing, new service launches, and many other operational constraints that force service moves. To handle these uncertainties, a traffic forecast may specify 90% of the trend to ensure sufficiently high confidence in the forecast.

Moreover, related capacity planning methodologies are often based on a single traffic matrix, as discussed further below, which creates a risk of biasing the design toward that single traffic matrix. In case of a future deviation from the single traffic matrix, additional capacity may be required to minimize total network risk. Operationally, any observed traffic shift requires investigation by network planners to identify if the change is catastrophic for the network or not. Overall, this related methodology is reactive, ad hoc, and time-consuming. Accordingly, this application discloses improved systems and methods for configuring networks, as discussed in more detail below.

As discussed further below, this application generally presents a design and operational experience of a hose-based backbone network planning system. The initial adoption of the hose model in network planning may be driven by capacity and demand uncertainty that places pressure on backbone expansion. Since the hose model abstracts a level of aggregated traffic volume per site, peak traffic flows at different time can be multiplexed to save capacity and buffer traffic spikes. In one embodiment, the design involves heuristic algorithms to select hose-compliant traffic matrices and cross-layer optimization between optical and Internet Protocol networks.

Features from any of the embodiments described herein may be used in combination with one another in accordance with the general principles described herein. These and other embodiments, features, and advantages will be more fully understood upon reading the following detailed description in conjunction with the accompanying drawings and claims.

This application discloses technology that may increase the ability of network capacity upgrade planners to efficiently plan upgrades to network capacity while additionally better handling uncertainty in the forecasting of future network traffic growth. The technology may generally achieve these benefits by applying a hose-based approach, rather than a pipe-based approach, to network planning, as discussed in more detail below. In particular, the technology may fundamentally base the plan for the network capacity upgrade on a constraint model that builds in uncertainty and, therefore, generates a multitude of different traffic matrices to be satisfied by the network capacity upgrade plan. The resulting plan will thereby be much more resilient and effective than conventional plans that are based upon a single network traffic matrix that was forecast to describe expected growth in network traffic. Such single network traffic matrices may be brittle and less effective at handling uncertainty.

Although the technology here generates network capacity upgrade plans that are more resilient, the tolerance for uncertainty in network traffic growth generates a much larger and potentially less tractable set of traffic matrices to be satisfied by the network capacity upgrade plan. Accordingly, the technology of this application may also provide techniques for filtering an initial set of traffic matrices to produce a more tractable set of traffic matrices, which may be considered as dominating traffic matrices, as discussed further below.

Global online service providers build wide-area backbone networks for connecting thousands of Point-of-Presence (PoP) sites and hundreds of Data Centers (DCs) across continents. To keep up with the explosive traffic growth, tremendous money and engineering effort are constantly being invested in expanding and upgrading the backbone network. Network planning is thus important to the backbone evolution, with the ultimate goal of devising capacity-efficient network build plans that are resilient to unforeseen demand uncertainties from service changes and traffic dynamics.

The technology described herein may achieve this goal by innovatively adopting the hose model in backbone planning. This application shares a design and deployment of hose-based network planning. Unlike the standard pipe model used in network planning that abstracts the network as traffic demands between site pairs, the hose model specifies the aggregated ingress/egress traffic volume per site. This model enables one to plan for "peak of sum" traffic with the hose model rather than "sum of peak" traffic with the pipe model. Because peak traffic flows are unlikely to happen simultaneously, the multiplexing gain results in significant capacity saving and leaves capacity headroom for traffic uncertainties in the future. One measurement shows that the hose model has 25% lower demand and can tolerate 50% more traffic uncertainty.

In the hose model, for each node, VPN provisioning and VM placement map hose capacity specification to a fixed network topology. Routing paths to different source/destination nodes are opportunistically chosen to share links, with the purpose of preserving the aggregated traffic demand in the hose model to the largest degree. However, when paths split in the network, a hose capacity cap is allocated on each link to serve the worst-case traffic, under the business contract that VPN and VM tenants' capacity requirements should be strictly guaranteed. This approach does not apply to network planning. First, the network topology may be unknown and may benefit from planning. Second, the capacity duplication at path splits may follow "sum of peak" abstraction and may compromise the multiplexing gain of the hose model. In particular, this may underload a network, which may cost the price of building an over-provisioned backbone.

One contribution of this application is a solution to the problem described above. The solution may leverage the insight that, regardless of a network topology, capacity should be granted to node pairs point-to-point, which naturally fits the pipe model. Therefore, the problem may involve converting a hose input into pipe traffic matrices (TMs). However, the continuous hose space contains an infinite number of TMs, thus it may be computationally intractable to plan for all possible pipe TMs under the hose constraints. A challenge is to generate a small subset of TMs to represent the hose space. This application proposes a series of heuristic algorithms to address this challenge. The application therefore discloses a design for a sampling scheme to generate candidate TMs uniformly in the hose space. From these TMs, one may find critical TMs that stress current bottleneck links, which are potential locations to deploy additional capacity. This application proposes a sweeping algorithm to quickly find bottleneck links in the network. Critical TMs may be chosen through optimization, and the application may also describe "hose coverage" as a metric to quantify how representative these chosen TMs are. Another contribution of this application is to share a production network planning process, with practical considerations in a network setting. The application may further describe the separation of short-term and long-term planning, the abstraction to simplify interaction between the optical and Internet Protocol, the resilience policy to protect against failures, and the optical-to-Internet-Protocol cross-layer capacity optimization. The application may also further evaluate the performance of hose-based network planning system in production. The application may demonstrate that the hose model can save 17.4% capacity compared to the pipe model and may drop up to 75% less traffic under unplanned failures. With these advantages of the hose model, the network can scale up on a per-node basis, as easily as storage and compute resources, in the future. This concludes the more detailed introduction.

The following provides a more detailed discussion of the motivation for the technology of this application. The hose model may abstract the network by aggregating ingress and egress traffic demand per node, without the model necessarily knowing the specific source and sink of each traffic flow. This model contrasts with the pipe model that presents the pair-wise traffic demand between nodes. In related systems, network planning is based on the pipe model, because pairwise capacity deployment plans may be realized in the end. However, production data may demonstrate the benefits of the hose model in capacity planning.

The technology here may be based in part on an analysis of production traffic on a network backbone. To eliminate the time-of-day effect, the analysis may consider an especially busy hour of day, when the total traffic in the backbone is the highest in the day. The traffic may be sampled once per minute. Among sixty data points in the busy hour, the pipe model may consider the 90th percentile as the peak traffic demand as specified in a traffic forecast. For hose model demand, the analysis may aggregate the ingress and egress traffic per site for each data collection point and obtain the "peak of sum," or the 90th percentile of the sum traffic values. A real-world traffic forecast may use the moving average of the 90th percentile peak traffic across an N-day window to smooth the traffic demand. The analysis may also add 3× the standard deviation of the N-day data to the moving average as a buffer for sudden traffic spikes. To mimic this process, one may apply this method to obtain the hose and pipe "average peak" demand, as opposed to the "daily peak" demand described previously. Specific advantages of the hose model are as follows.

One advantage is traffic reduction. One difference between hose model and the pipe model when deploying capacity is the difference between "peak of sum" and "sum of peak" traffic. If using the hose model, the multiplexing gain allows the technology here to plan for less capacity, as the instances of pipe traffic sharing the same source/sink are unlikely to reach the peak simultaneously. Because the "average peak" traffic is the realistic input to a traffic forecast, there may be a good reason to conclude that a considerable proportion of capacity can be saved just by adopting the hose model for planning.

Another advantage is tolerance to traffic dynamics. The multiplexing effect also means that hose model planning can cover more traffic variations. In one example, if a plan is made for 0.55 unit of capacity, this will cover 90% of the cases in the hose model, but only 40% in the pipe model. The higher percentile in the hose model indicates that it can tolerate more traffic uncertainty. Since the hose model is constrained by the aggregated traffic amount, not by a particular TM, it has more headroom to absorb unexpected traffic spikes.

Another advantage is increased stability in traffic demand. One analysis may measure variance of hose and pipe traffic. To make different traffic volumes comparable, the analysis may use coefficient of variation as the metric, which is the standard deviation of the traffic volume divided by the mean. In terms of the coefficient of variation for the "daily peak" traffic, the relative traffic dispersion in the hose model is much smaller than in the pipe model, with a shorter tail as well. As a result, the hose model provides a more stable signal for planning and simplifies traffic forecast. With these, the technology described herein may enable network scaling up as easily as storage and compute resources, where a node can have an accurate approximation of its future growth, without a concern about the interaction with other nodes in the network.

An additional advantage is increased adaptation to service evolvement. Services evolve over time in production. Possible causes include service behavior changes, relabeling of Quality of Service (QoS) classes, traffic shifts for load balancing, new service launches, and many others. In one example of a user database (UDB) service, due to resource and operational constraints, the UDB servers storing data may sit in a few regions, and UDB-less regions may use a caching service to fetch data from the UDB regions nearby. In terms of the amount of traffic flowing from UDB regions B and C to UDB-less region A, a significant traffic change is a result of the service changing the primary UDB region from B to C. Two specific incidents may create several Tbps of traffic shifts, where a pipe model would fail. In contrast, because the total traffic amount stayed the same, the hose ingress traffic at region A experienced little in terms of disruptions. The traffic aggregation nature of the hose model is naturally more resilient to service changes, making it a future-proof solution to network planning. This concludes the detailed discussion of the motivation for the technology described herein.

Detailed descriptions of a method for configuring networks are provided with reference to FIG. 1. Detailed descriptions of a system for configuring networks are provided in connection with FIG. 2. FIGS. 3-10 provide diagrams that help elaborate on the technology disclosed in FIGS. 1-2.

FIG. 1 is a flow diagram of an exemplary computer-implemented method 100 for configuring networks. The steps shown in FIG. 1 may be performed by any suitable computer-executable code and/or computing system, including the system illustrated in FIG. 2. In one example, each of the steps shown in FIG. 1 may represent an algorithm whose structure includes and/or is represented by multiple sub-steps, examples of which will be provided in greater detail below.

Figure 2:
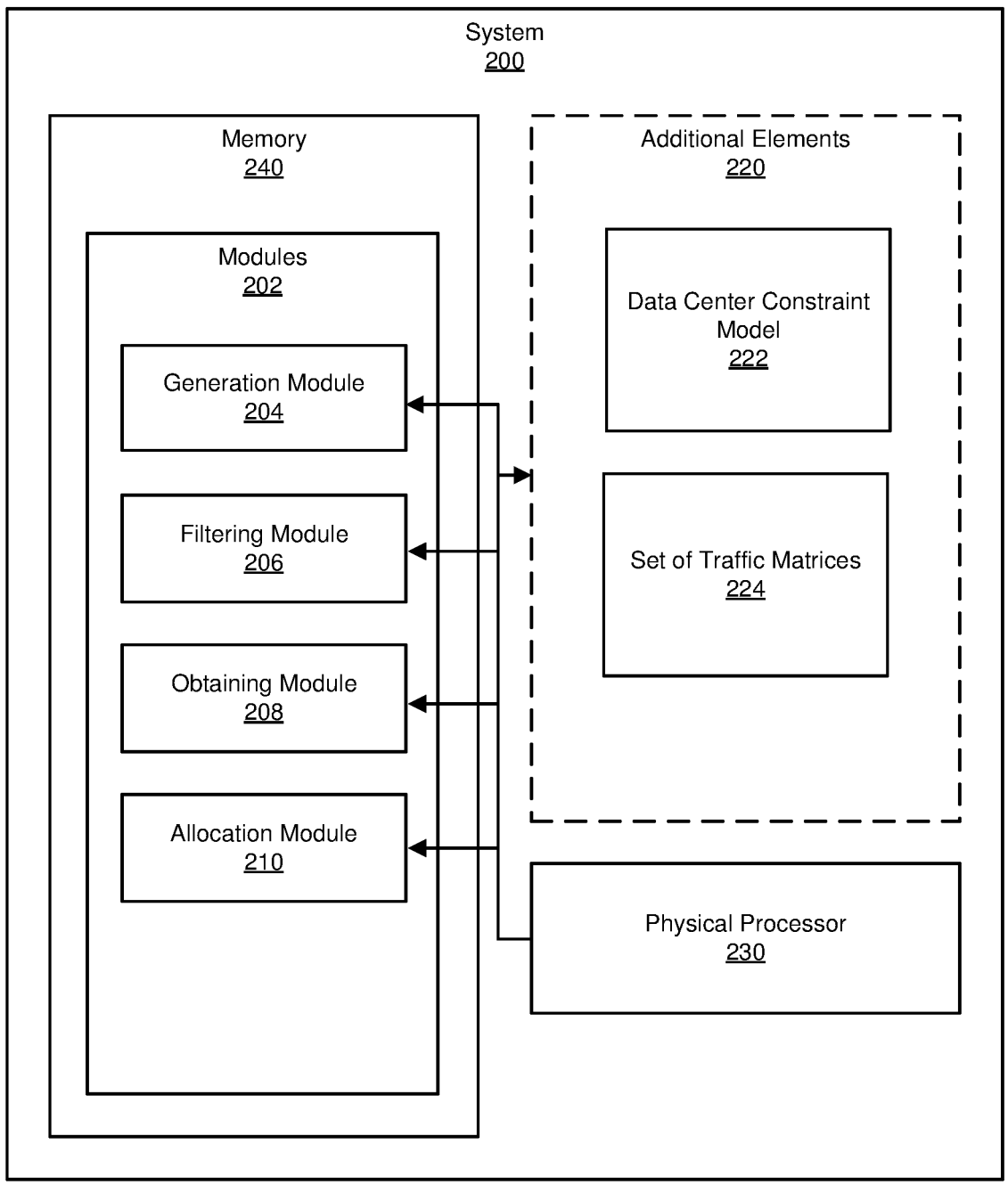
FIG. 2 is a block diagram of an example system for configuring networks.

The flow diagram of FIG. 1 may be performed at least in part by system 200 of FIG. 2. As further shown in this figure, system 200 may include a memory 240 and a physical processor 230. Within memory 240, modules 202 may be stored. Modules 202 may include a generation module 204, a filtering module 206, an obtaining module 208, and an allocation module 210. Modules 202 may facilitate the performance of method 100 at least in part by interacting with additional elements 220, which may include a data center constraint model 222 and a set of traffic matrices 224, as discussed in more detail below.

The following provides a more detailed description of the structure and capabilities of system 200. In terms of a network model, a backbone network may connect a number of DCs and PoPs together. The network model may include IP routers over a Dense Wavelength Division Multiplexing optical network. The IP routers may be connected using IP links that route over multiple fiber segments. In one model, the network is represented as a two-layer graph: the IP network G=(V, E), where the vertices V are IP nodes and the edges E are IP links, and the optical network G'=(V', E'), where the vertices V are optical nodes and the edges E' are fiber segments.

For each IP link e∈E, FS(e) may be the set of fiber segments that e rides over, which form a path on the optical topology. The IP link e consumes a portion of spectrum on each fiber segment l∈E' over which e is realized. For example, a 100 Gbps IP link realized using Quadrature Phase Shift Keying modulation can consume 50 GHz of spectrum over all fiber segments in its path.

In terms of a failure model, the technology described herein may analyze a set of fiber failures in the backbone. Every IP link e∈E over the failed fibers would be down. In order to provide desired reliability to the service traffic, the technology described herein may pre-define a set of failures R referred to as planned failures. The production network should be planned with sufficient capacity such that all service traffic can be routed for each failure r∈R.

System 200 may solve the following problem statement. Network capacity is the maximum throughput (in Gbps, Tbps, or Pbps) the IP network, and individual IP links, can carry. The problem of capacity planning is to compute the desired network capacity to be built in the future. Building a network involves complex steps, including: (1) procure fibers from third-party providers, (2) build terrestrial and submarine fiber routes, (3) pull fibers on existing ducts, (4) install line system to light up the fibers, (5) procure, deliver, install hardware (optical and IP) at sites, and/or (6) secure space and power at optical amplifiers and sites. All these activities have high lead time, taking months or even years to deliver. Thus, capacity planning is helpful to the future evolution and profitability of the network.

In a network planning problem, the objective may be to dimension the network for the forecast traffic under the planned failure set R by minimizing the total cost of the solution. The cost of the network may be calculated based on a weighted function of equipment (fibers and other optical and IP hardware) procurement, deployment, and maintenance to realize the network plan.

In terms of planning schemes, the technology described herein may categorize capacity planning into two sub-problems: short-term planning and long-term planning. Short-term planning may output an exact IP topology (i.e., the IP links and the capacity on each link), whereas long-term planning may determine the fibers and hardware to procure. A corresponding design decision may be based on the fact that network building can be an iterative process and long-term planning may serve as a reference point in many scenarios. For example, the fiber procurement plan may change at execution time according to the availability of fiber resources on the market. Short-term planning may be conducted after fiber and hardware are secured and in place, because turning up capacity may be requested at a short notice.

In terms of the planning process, network planning may begin with a traffic forecast. Unlike approaches that model total traffic per site, the technology described herein profile the growth of each individual service. This method may be more accurate for a use case where new DCs are deployed yearly and services are migrated to different DCs when necessary. As the traffic forecast is based on the hose model, the aggregated hose constraints from individual services are fed to the capacity planner as the overall hose demand in the backbone.

One aspect of hose-based network planning is converting the hose constraints into pipe TMs. Thus, the technology described herein may narrow down an infinite number of possible pipe TMs to a small set of representative ones. Short-term and long-term planning may then be based on the reference TMs with different optimization formulations, considering various failure scenarios under the resilience policy.

The output of planning may be a Plan Of Record (POR), in the format of capacity between site pairs. The POR from short-term planning may be provided to a capacity engineering component for capacity turn-up, and the POR from long-term planning may be provided to a fiber sourcing component for fiber procurement and to an optical design and IP design component for deployment of fibers and optical line systems.

Figure 7:
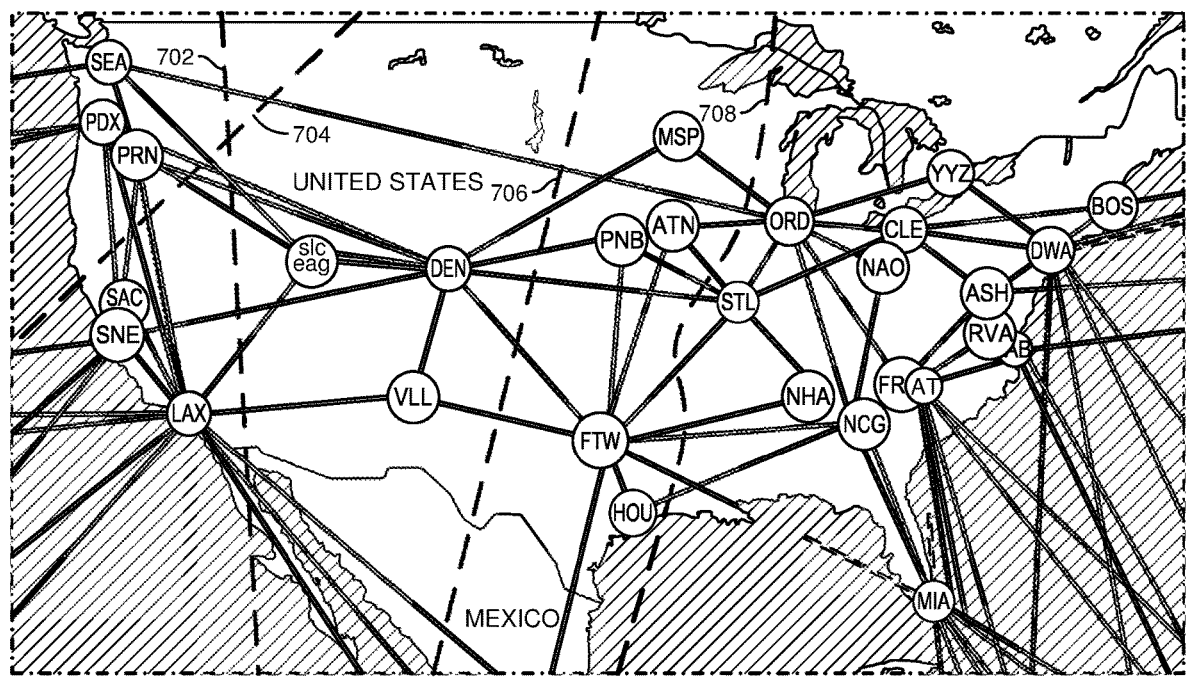
FIG. 7 is a diagram of example cut sets across a network topology.

Returning to FIG. 1, at step 110 one or more of the systems described herein may generate a data center constraint model by placing a constraint on a total amount of ingress or egress traffic a service expects from each respective data center of multiple data centers. For example, FIG. 7 shows an illustrative example of a network topology with a multitude of different data centers as nodes. Examples of such data centers may include LAX and SNE, as further shown in the figure. Accordingly, at step 110, generation module 204 may generate data center constraint model 222 by placing a constraint on a total amount of ingress or egress traffic a service expects from each respective data center of multiple data centers, such as data centers LAX or SNE shown in FIG. 7. The term "data center constraint model" may refer to a model that places a constraint on data center ingress and/or egress network traffic, as discussed in more detail below in connection with FIGS. 4-5.

Figure 3:
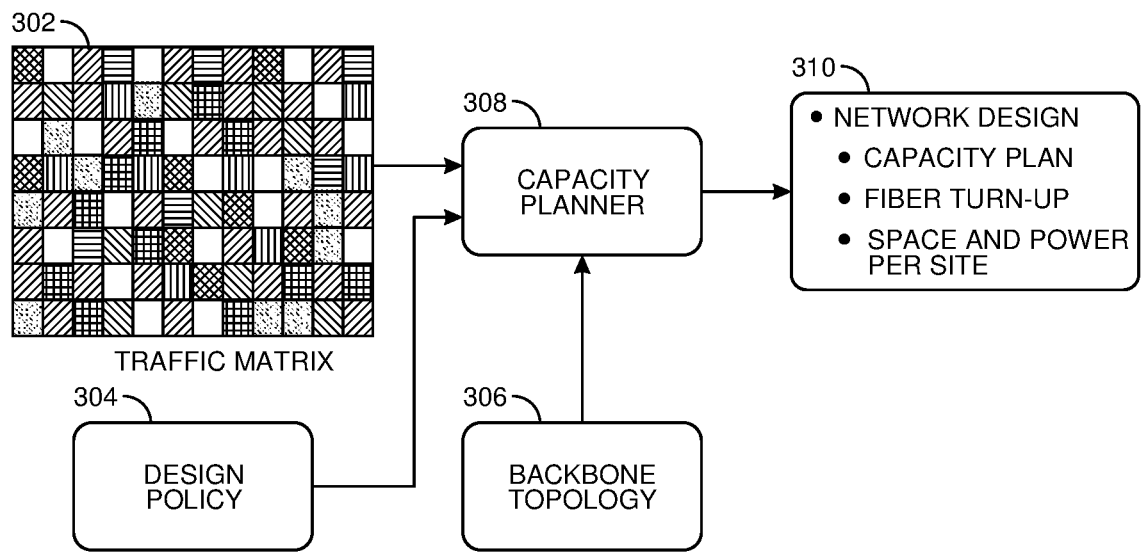
FIG. 3 is a diagram of a related methodology for configuring networks based on a single traffic matrix.
Figure 4:
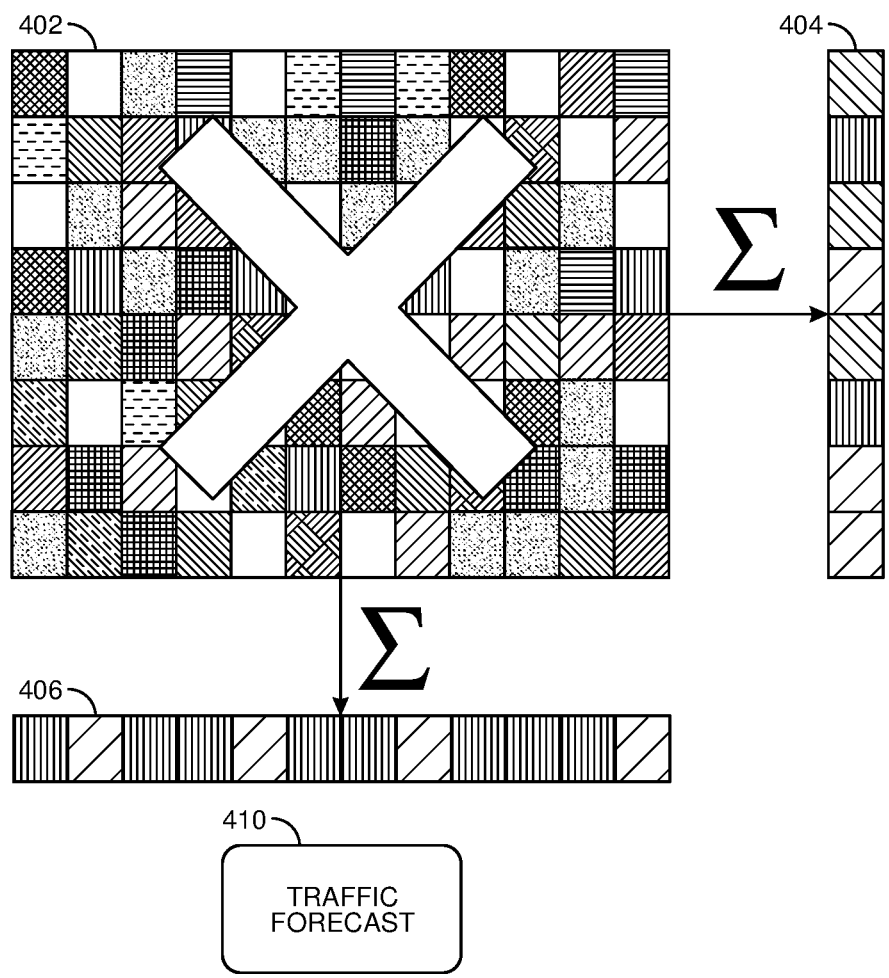
FIG. 4 is a diagram of a methodology for configuring networks based on a hose-based approach rather than a pipe-based approach.

Generation module 204 may perform step 110 in a variety of ways. FIGS. 3-4 help to illustrate the general methodology by which generation module 204 may perform step 110. In particular, FIG. 3 shows a related methodology that produces a single traffic matrix 302 as one input to a capacity planner 308. In addition to traffic matrix 302, a design policy 304 and a backbone topology 306 may also be input to capacity planner 308. Design policy 304 may specify requirements or desired features of the upgraded network. For example, design policy 304 may specify an amount of network traffic that should be handled by the capacity of one or more data centers. Design policy 304 may also specify one or more potential failure conditions that the upgraded network should nevertheless be able to handle or satisfy with sufficient capacity. Backbone topology 306 may correspond to a generally longitudinal and latitudinal network topology with data centers as nodes and backbone lines as links within a corresponding graph. FIG. 7 shows an illustrative example of such a backbone topology. Lastly, capacity planner 308 may generate a network design 310, which may further specify a capacity plan, a fiber turn-up level or architecture, and/or a level of space and power per data center or site.

It may be helpful to describe the intended meaning of traffic matrix 302. The rows and columns of this traffic matrix generally correspond to data centers, such as the data centers shown in the network topology of FIG. 7. Although FIGS. 3-4 show N×M traffic matrices for illustrative purposes, traffic matrix 302 may also form an N×N matrix, with the rows and columns functioning as indices for the same set of data centers. For example, the top-left square of traffic matrix 302 may specify or indicate expected or forecasted network traffic between a first data center (e.g., as a source) and the same first data center (e.g., as a sink). As such, the value at this particular square may be blank or null, since the technology here is generally less concerned with intra-data-center network traffic as distinct from inter-data-center network traffic. The diagonal from the top-left square to the bottom-right square may similarly be blank or null in a parallel manner.

Nevertheless, the square to the right of the top-left square of traffic matrix 302 may indicate expected network traffic between the first data center (corresponding to the first row), as a source, and a second data center (corresponding to the second column), as a sink. And so on. Overall, traffic matrix 302 may therefore indicate expected or forecasted network traffic between each pair of data centers formed by the permutations of a set of data centers, such as those shown in FIG. 7, for example.

The related methodology of FIG. 3 may suffer from one or more problems or inefficiencies. In particular, the use of a single traffic matrix makes the corresponding forecast relatively brittle. In other words, the use of a single traffic matrix makes it relatively more difficult to handle uncertainty in the forecast of network traffic growth. The use of the single traffic matrix effectively forces the capacity planner to make a specific guess about how network traffic will grow in the future. The use of the single traffic matrix also creates computational challenges due to the requirement of generating N×N (minus the diagonal) forecast calculations. It would, therefore, be helpful to identify a methodology that addresses uncertainty in forecasting network traffic growth while also better handling or reducing the computational challenges. The methodology of FIG. 3 may be referred to as a "pipe-based" approach that calculates a volume of network traffic for each pair within the set of data centers, where each pair forms a "pipe."

FIG. 4 shows a diagram for an improved methodology for forecasting network traffic growth that addresses the problems outlined above, and which may be performed or facilitated by one or more of modules 202 according to method 100, as discussed above. As further shown in this figure, a traffic matrix 402 may correspond to traffic matrix 302 of FIG. 3. The large "X" in FIG. 4 indicates that the methodology of FIG. 4 will omit this single traffic matrix and, instead, use a vector 406 and a vector 404. Vector 406 may indicate the summation of the values along corresponding columns of traffic matrix 402. Similarly, vector 404 may indicate the summation of the values along corresponding rows of traffic matrix 402. The improved methodology of FIG. 4 may generate a traffic forecast 410.

Figure 5:
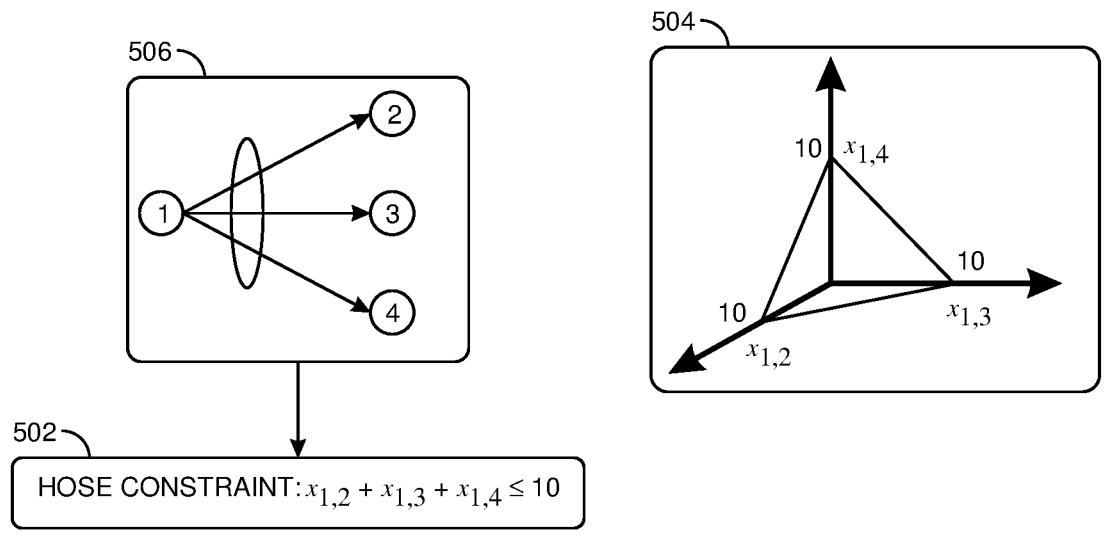
FIG. 5 is a diagram of an example convex polytope that corresponds to a data center constraint model.

The data center constraint model may place a constraint on a total amount of ingress and/or egress network traffic from a data center, such as the first data center. FIG. 5 shows an illustrative diagram of a hose constraint 502 that may be placed on a set 506 of four data centers. In this specific example, node 1 may generate egress network traffic, whereas node 2, node 3, and node 4 do not generate any egress network traffic. As an illustrative example, the data center constraint model may place a constraint of "10" on the total amount of egress network traffic from node 1. The constraint may be defined in any suitable metric or unit for measuring a volume, flow, or bandwidth of network traffic. In such examples, different constraint values may be placed on different data centers or the same value may be used. Similarly, different constraint values may be placed on ingress versus egress network traffic, or the same value may be used. Alternatively, the data center constraint model may place a constraint of "10" on the total amount of ingress or egress network traffic from all of the nodes, which in this scenario would result in the same output, because all of the egress network traffic in this example comes from node 1. FIG. 5 also further illustrates how placing hose constraint 502 on a data center within set 506 of the four data centers indicates a corresponding convex polytope 504.

Convex polytope 504 may form a surface with a mathematically continuous set of points along this surface. Each point within the set of points may correspond to a single traffic matrix, analogous to traffic matrix 402, which satisfies hose constraint 502. In particular, the points along the surface may maximally satisfy the hose constraint, whereas points within convex polytope 504 underneath the surface may satisfy the hose constraint without achieving the maximum value of 10. The mathematically continuous nature of the set of points on the surface may create a computational challenge in terms of calculating a network capacity upgrade plan based on an analysis of the traffic matrices that correspond to the set of points. In particular, such a continuous set will generally be infinite in nature. For this reason, it may be helpful to filter the set of points to create a finite and more tractable set of points for analysis. Such a finite and tractable set of points may include, for example, the three extremities or maximal points along convex polytope 504, which effectively form corners of the convex polytope. Further techniques and refinements for selecting a more tractable set of representative traffic matrices will be discussed further in connection with FIGS. 6-10. The methodology of FIGS. 4-5 that places a constraint on a total amount of ingress and/or egress network traffic at a data center may be referred to as the "hose-based" approach, as distinct from the pipe-based approach of FIG. 3.

Leveraging the hose-based approach may provide a number of substantial benefits and improvements over the pipe-based approach. In particular, usage of the hose-based approach reduces the level of the traffic forecast while nevertheless preserving a level of confidence that the resulting network capacity plan will not become overburdened. In other words, usage of the hose-based approach reduces the need to overshoot or overcorrect the network capacity plan to accommodate uncertainty in the forecast. This may further result in a statistical multiplexing gain where the hose-based approach is calculated as the peak of sums and the pipe-based approach is calculated as the sum of peaks, in terms of network traffic. Usage of the hose-based approach may also reduce a daily peak value by 10% to 15% and may reduce an average peak level by 20% to 25%. The hose-based approach to forecasting is also more stable and introduces a lower level of variance. Similarly, usage of the hose-based approach creates benefits in terms of operational simplicity. Planning complexity becomes simpler due to the transition from requiring N calculations (hose) rather than N squared (pipe). Usage of the hose-based approach also simplifies cross-region demand shifts.

Returning to FIG. 1, at step 120 one or more of the systems described herein may filter a set of traffic matrices that indicate points in the data center constraint model by comparing the set of traffic matrices against cut sets of a network topology that indicate network failures to create a tractable set of dominating traffic matrices. As discussed above, FIG. 3 shows example traffic matrix 302, and FIG. 7 shows examples of network topology cut sets. Accordingly, at step 120, filtering module 206 may filter a set of traffic matrices, such as traffic matrix 302, that indicate or sample points in data center constraint model 222 by comparing the set of traffic matrices against the cut sets of the network topology that is shown in FIG. 7.

Figure 6:
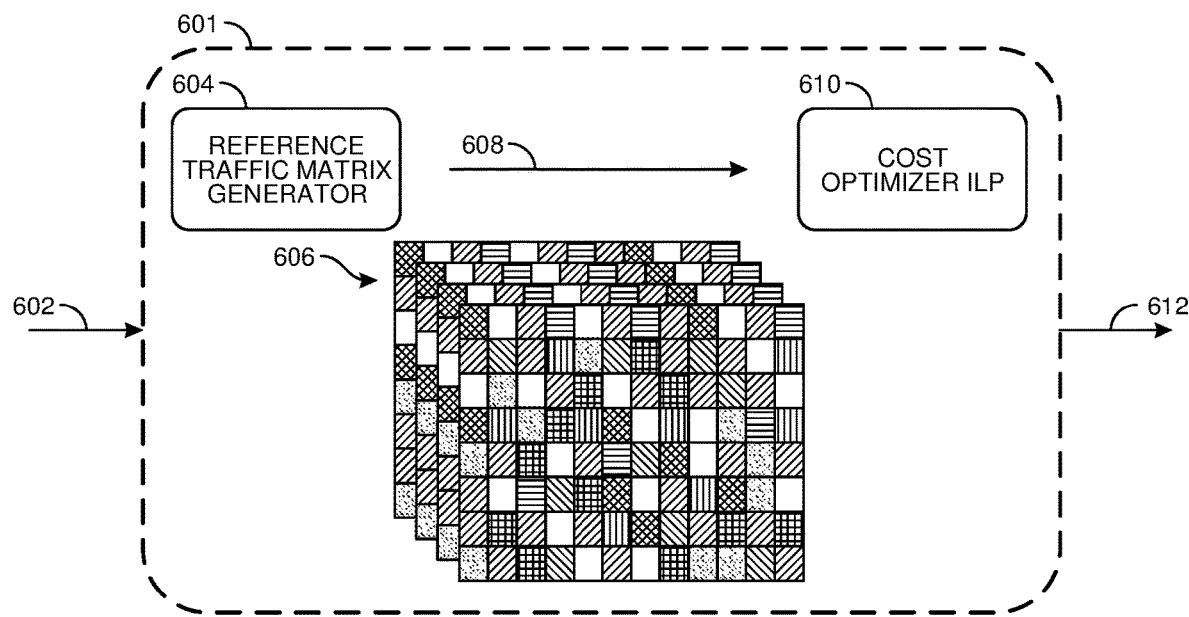
FIG. 6 is a diagram of an example workflow for generating reference traffic matrices as inputs to a cost optimizer formulation.

Filtering module 206 may perform step 120 in a variety of ways. From a high-level perspective, FIG. 6 shows a workflow 601 that outlines a general process for filtering reference traffic matrices from an original set of traffic matrices. At step 602, the data center constraint model referenced at step 110 may be input to a reference traffic matrix generator 604. Reference traffic matrix generator 604 may generate a filtered set 606 of traffic matrices which may serve as reference or representative traffic matrices that, at step 608, may be input to a cost optimizer integer linear programming formulation 610. Reference traffic matrix generator 604 may operate in accordance with the examples of FIGS. 8-10. Returning to FIG. 6, at step 612, cost optimizer integer linear programming formulation 610 may output a network capacity upgrade plan for a cross-layer network upgrade architecture, as discussed further below.

As first introduced earlier above, FIG. 7 shows an illustrative example of a network backbone topology with nodes as data centers and non-dashed lines as backbone lines for a corresponding network. The example of this figure corresponds to North America. Nevertheless, method 100 may be performed in connection with any other global, regional, or local inter-data-center network for an area, state, territory, country, continent, or the entire world. FIG. 7 also illustrates how four graph cuts, including a graph cut 702, a graph cuts 704, a graph cut 706, and a graph cut 708, may form cut sets (i.e., mathematical divisions of the set of nodes into two separate sets of nodes) of the network topology. In particular, FIG. 7 illustrates how these graph cuts form either straight lines (e.g., graph cut 702) or substantially straight lines (e.g., graph cut 708). Each of these graph cuts may indicate or represent a potential network failure, as specified by design policy 304 of FIG. 3, which may require or request that network design 310 provide sufficient capacity to handle network traffic across the corresponding graph cut despite such a network failure. Illustrative examples of such network failures may include one or more of singular fiber cuts, dual submarine link failures, and/or repeated failures.

Figure 8:
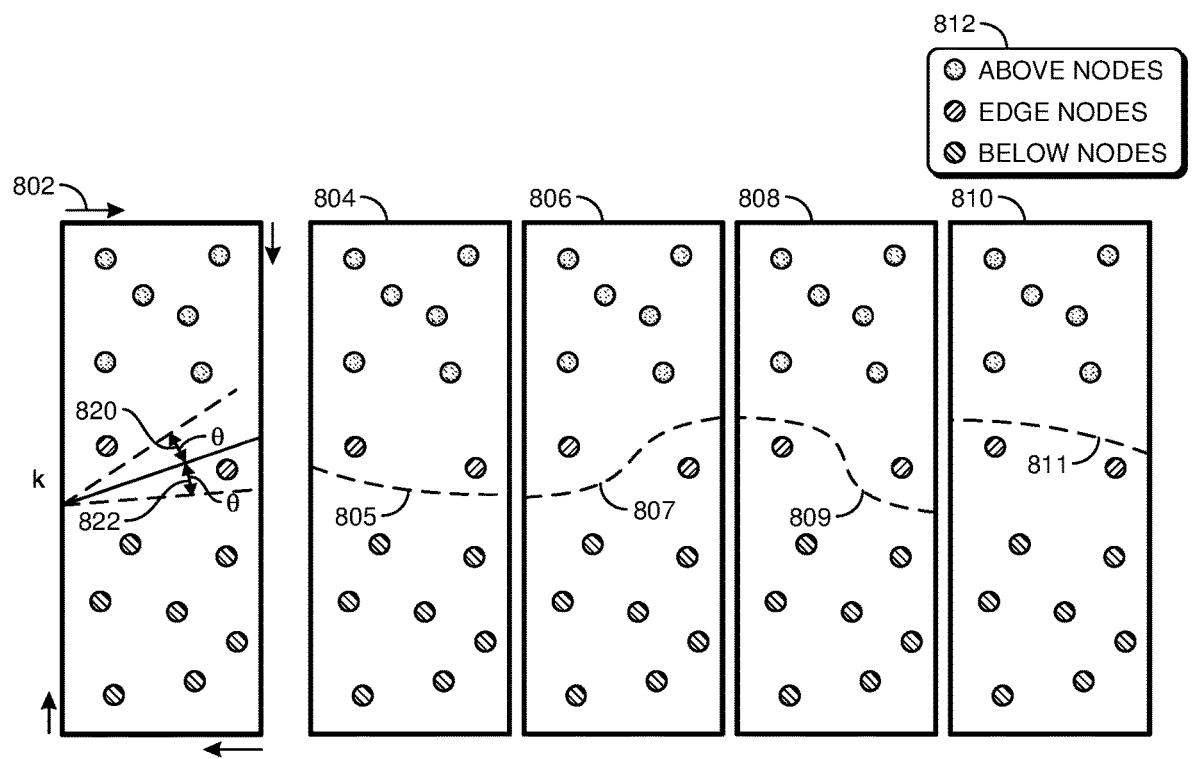
FIG. 8 is a diagram that illustrates a sweeping methodology for generating cut sets.

FIG. 8 shows a diagram of an illustrative sweeping methodology for generating straight or substantially straight graph cuts and corresponding cut sets. In particular, the methodology may sweep in a direction 802 around the set of nodes to produce a set of four cut sets, including a cut set 804, a cut set 806, and a cut set 808, and a cut set 810, which may be formed by a graph cut 805, a graph cut 807, a graph cut 809, and a graph cut 811. The methodology may draw a reference cut line at each sweeping step, which may split the nodes into three mutually exclusive categories. These three categories are identified by reference key 812 in FIG. 8. The first category may include edge nodes, which indicate a definitional value smaller than a threshold alpha, where the definitional value is defined as the distance of the edge node to the original (e.g., straight) cut line divided by the distance of the farthest node in the network to the cut line. The second category may include above nodes, which are above the cut line but which are not included within the edge nodes group. The third category may include below nodes, which are below the cut line but are not included in the edge nodes group. According to the methodology of this figure, the sweeping procedure may center around k points per rectangle side and move in steps of an angle theta, such as an angle 820 and an angle 822 shown in FIG. 8. The reference cut (e.g., the straight line between angle 820 and angle 822) in the example of the sweeping methodology may create two edge nodes, and the permutations of these two edge nodes may form four graph cuts. Accordingly, network cuts may be generated for all possible bipartite splits of the edge nodes combined, respectively, with the above and below nodes.

Figure 10:
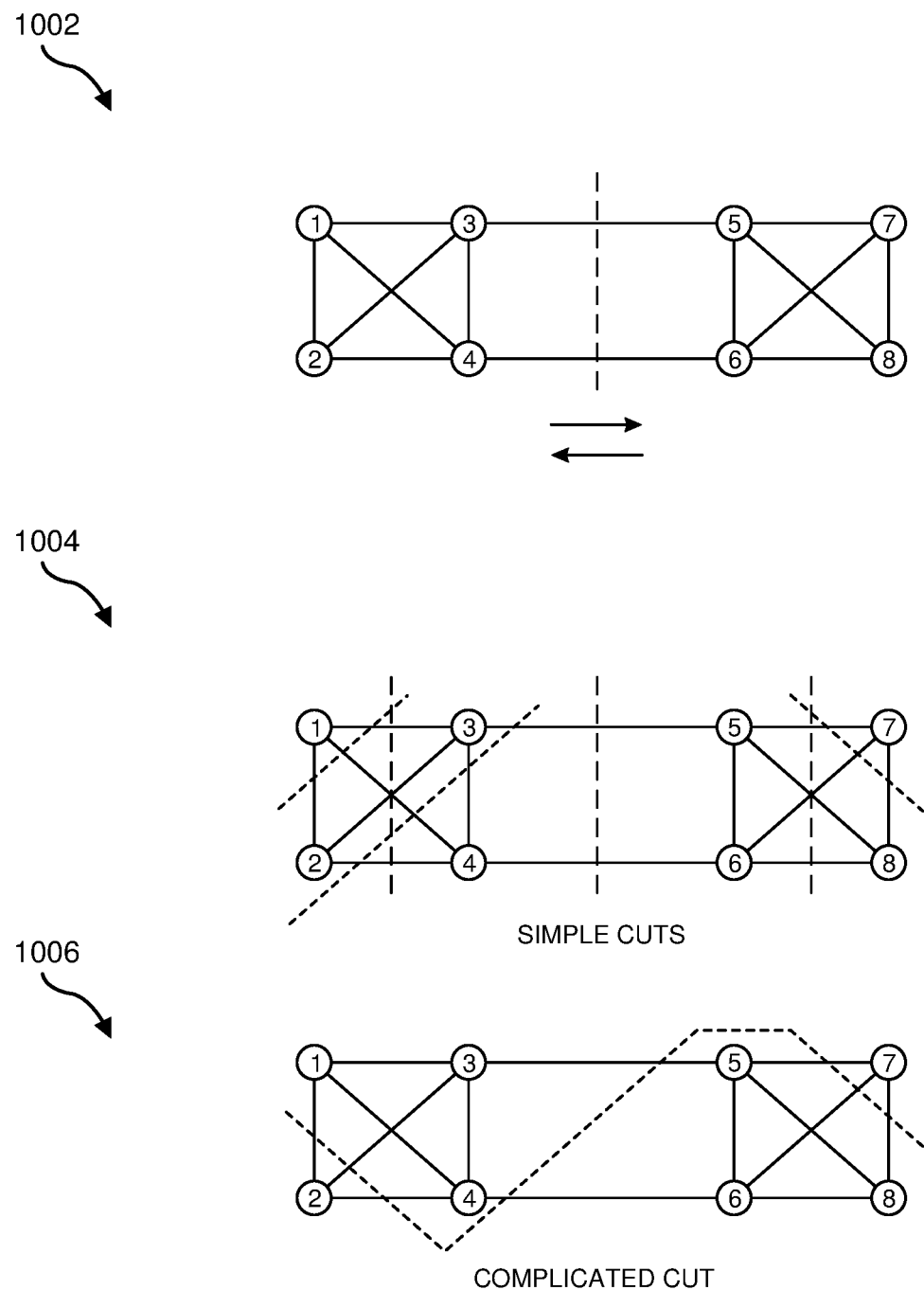
FIG. 10 is a series of diagrams that illustrate differences between simple cut sets and complicated cut sets.

FIG. 10 shows another set of diagrams that further illustrate techniques for generating cut sets. Diagram 1002 shows an example of a single cut set that may be generated by a vertical dashed line, thereby dividing the set including all eight nodes into two separate sets that each include four nodes, as shown in the figure. Diagram 1004 and diagram 1006 show simple cuts and a complicated cut, respectively, which may be contrasted with each other. Simple cuts may generally form straight lines, as shown in FIG. 10. Nevertheless, simple cuts may also be generated by lines that are substantially straight, without being perfectly straight. For example, simple cuts may include relatively small deviations from the straight line according to the sweeping procedure of FIG. 8 that generates all possible bipartite splits of the edge nodes combined respectively with the above nodes and the below nodes. In some scenarios, simple cuts may be preferable to complicated cuts. For example, the long jagged dashed line in diagram 1006 may correspond to a complicated cut.

At step 130, filtering module 206 may filter the set of traffic matrices by comparing the traffic matrices to the cut sets, such as the cut sets shown in FIG. 8. In particular, filtering module 206 may search for dominating traffic matrices. The term "dominating traffic matrix" for a network cut may refer to a traffic matrix in the set of traffic matrices (e.g., sampled or random selections of traffic matrices within the context polytope indicated by the data center constraint model) that has the highest traffic amount across the graph cut. This corresponds to the "strict version" of the dominating traffic matrix selection process. Additionally, or alternatively, a dominating traffic matrix for a network cut may refer to a traffic matrix from the set of traffic matrices having a traffic amount across the cut that is no smaller than 1 minus epsilon of the maximum among all the sampled traffic matrices, where epsilon is a small value in [0, 1]. This corresponds to the "slack version" of the dominating traffic matrix selection process. In some scenarios, the "slack version" of the dominating traffic matrix selection process may be preferred. Generally speaking, dominating traffic matrices may correspond to demand scenarios that are predicted to drive requirements for physical network resources.

Returning to the figures, FIG. 9 shows an example integer linear programming methodology that may select or discover the minimum number of traffic matrices with at least one dominating traffic matrix per network cut. The methodology of FIG. 9 may apply an integer linear programming formulation of the minimum set cover problem to the traffic matrices and cut sets of FIGS. 4-8. In this case, the universe to cover is the set of network cuts, and the covering sets are, for each slackly-dominating traffic matrix M (e.g., dominating according to the slack version), the set of network cuts for which that dominating traffic matrix is slackly-dominating. The variable AM may correspond to a binary assignment variable, which may be 1 if a candidate dominating traffic matrix M is selected. The variable AM may be 0 otherwise. T may be the set of traffic matrices that are being considered. In other words, T may refer to the set of all sampled traffic matrices that are slackly dominating for some network cut. The top right quadrant of the table in FIG. 9 may specify the number of traffic matrices that are chosen. The methodology of FIG. 9 seeks to minimize this number. D(C) may refer to the set of slackly dominating traffic matrices for network cut C. Lastly, the bottom right quadrant of this table refers to the number of chosen traffic matrices that slackly dominate network cut C. For every network cut C, the goal is for this value to be at least 1. In other words, the goal of the methodology here is to ensure that the set of chosen traffic matrices includes at least one traffic matrix that slackly dominates network cut C according to the slack version of the dominating traffic matrix selection process. Applying the integer linear programming formulation of FIG. 9 may generate the tractable set of dominating traffic matrices, for example. To be clear, the term "dominating traffic matrix" may refer to either strictly or slackly-dominating traffic matrices.

As part of performing step 120, filtering module 206 may generate and sample traffic matrices. The following provides a more detailed discussion of generating such traffic matrices. The generation procedures may include three stages: traffic matrix sampling, bottleneck links sweeping, and dominating traffic matrices selecting.

In a first stage of traffic matrix sample, a traffic matrix (TM) for an N-node network topology may correspond to an N×N matrix, where each coefficient $m_{i,j}$ represents the traffic amount of a flow (typically in Gbps in practice) from the source node i to the destination node j. The flow traffic amount may be non-negative, and in some examples a node does not generate traffic to itself. Hence, the coefficients may be in $R_+$ and all diagonal coefficients may be zero.

A valid TM may satisfy the following hose constraints, where u→$_s$ and u→'d are the 1×N and N×1 all-ones column and row vectors, and the corresponding demand vectors h→$_s$ and h→'$_d$ bound the total egress and ingress traffic amount at the source and destination nodes. These constraints form a convex polytope in the $N^2$−N dimension space, where each non-zero coefficient in the TM is a variable. FIG. 5 illustrates a highly simplified 3D example with variables m1,2, m1,3, and m1,4. Each valid TM is a point in the polytope space, and there are an infinite number of valid TMs in this continuous space.

Hose Constraints:

$$\vec{u}_s \cdot M \leq \vec{h}_s$$

$$M \cdot \vec{u}'_d \leq \vec{h}'_d$$

To generate TMs that satisfy the hose constraints, a first step is to sample the polytope space uniformly. A corresponding algorithm may include two phases for generating one sample TM. The algorithm may randomly create a valid TM in the polytope space in a first phase and stretch it to the polytope surfaces in a second phase, based on the intuition that TMs on the surfaces have higher traffic demands and translate to higher capacity requests for network planning.

In a first phase, filtering module 206 may initialize the TM to a zero matrix and assign traffic to the TM entries one by one in a random order. For every entry $m_{i,j}$, the maximal allowed traffic amount is the lesser of the two hose constraints for source i and destination j. Filtering module 206 may give this value a uniformly random scaling factor between 0 and 1 and assign the product to the entry in the TM. For bookkeeping, the consumed traffic amount may be deducted from the hose constraints.

In the second phase, filtering module 206 may add residual traffic to the TM to exhaust as many hose constraints as possible. Similar to the first phase, filtering module 206 iterates through the entries in a random order and adds the maximal allowed traffic amount to each entry. Because filtering module 206 iterates through all the entries and always consumes the maximal traffic, the second phase is guaranteed to exhaust the most hose constraints from the result of the first phase. It also guarantees that the egress and ingress hose constraints cannot be simultaneously unsatisfied (remaining constraints must be all egress or all ingress), because if that were the case, the algorithm would simply increase the associated source-destination flows until either ingress or egress constraints are exhausted.

The sampling algorithm outlined above is highly effective regardless of the simplicity of the network. In some examples, over 97% of the hose polytope space is covered with 105 sample TMs. The effectiveness comes from the high level of randomness: (1) filtering module 206 applies different permutations of the TM entries in each run to distribute the hose traffic budget in different ways, and (2) filtering module 206 uses a scaling factor to adjust the assignable traffic randomly according to the uniform distribution.

Filtering module 206 may also generate traffic matrices in part by sweeping through bottleneck links. It may be computationally infeasible to consider the enormous number of TM samples. Fortunately, different TMs have different levels of importance for network planning. As the goal of network planning is to add capacity to "bottleneck links" in the network, TMs with high traffic demands over the bottleneck links play a dominating role. These may be called TMs Dominating Traffic Matrices (DTMs), and filtering module 206 may aim to find a small number of DTMs such that designing the network explicitly for them has a high probability of satisfying the remaining TMs as well. From the perspective of graph theory, bottleneck links are captured by the network cuts that partition the nodes into two disjoint subsets. However, the number of network cuts is exponential to the network size. A production backbone network has tens to a few hundred nodes, thus enumerating all the cuts will be intractable. This application discloses a sweeping algorithm to quickly sample the network cuts, and the sweeping process is illustrated in FIG. 8.

The sweeping algorithm has a hyperparameter edge threshold a chosen in the [0, 1] interval. The network nodes are represented by their latitude and longitude coordinates. We draw the smallest rectangle inscribing all the nodes and radar-sweep the graph centering at points on the rectangle sides.

There are k equal-interval points per side and the sweeping is performed at discrete orientation angles of interval θ. As one example, k=1000 and θ=1°. The algorithm draws a reference cut line at each sweeping step, which splits the nodes into the following three mutually exclusive categories. Edge nodes, whose distance to the cut line divided by the distance of the farthest node in the network to the cut line is smaller than α. Above nodes, which are above the cut line but are not in the edge nodes group. Below nodes, which are below the cut line but are not in the edge nodes group.

Network cuts are all possible bipartite splits of the edge nodes combined respectively with the above and below nodes. In this algorithm, parameters k and θ define the sampling granularity, and the edge threshold a regulates the number of cuts considered per sampling step. As α increases, filtering module 206 is able to generate an increasingly large number of network cuts. In particular, setting α to 1 guarantees the enumeration of all partitions of the network.

Filtering module 206 may also generate traffic matrices in part by selecting dominating traffic matrices. The formal definition of DTM with respect to network cuts is as below. With the TMs sampled and network cuts generated according to the description above, filtering module 206 seeks to find the TM that produces the most traffic for every network cut.

The phrase "domination traffic matrix (strict version)" may, in some examples, refer to the traffic matrix in all the sampled traffic matrices that has the highest traffic amount across the cut. This definition yields as many DTMs as there are network cuts. To further reduce the number of TMs involved in planning computation, filtering module 206 may leverage the minimum set cover problem: if one slacks the DTM definition from the most traffic-heavy TM per network cut to a set of relatively traffic-heavy TMs within a bound to the maximum, the sets of DTMs for different cuts are likely to overlap and the cuts may be represented by a smaller number of overlapping DTMs. Filtering module 206 may therefore use a flow slack E and define the slack version of DTM as below.

Similarly, the phrase "domination traffic matrix (slack version)" may refer to a traffic matrix from the sampled traffic matrices whose traffic amount across the cut is no smaller than $1-\epsilon$ of the maximum among all the sampled traffic matrices, where E is a small value in [0, 1].

Filtering module 206 may formulate the minimum set cover problem such that the universe is the ensemble of network cuts C. For every cut $c \in C$, filtering module 206 obtains the set of DTMs D(c) under the given flow slack E according to the definition above. Combining them, filtering module 206 obtains a collection T={M} of all the candidate DTMs, where each DTM belongs to a subset of cuts in C. For example, a DTM may be generated by multiple cuts $\{c_i, c_j, c_k\}$ at the same time. Filtering module 206 may have the goal of finding the minimal number of DTMs to cover all the cuts in C.

Filtering module 206 may solve this minimum set cover problem by Integer Linear Programming (ILP). Filtering module 206 may define a binary assignment variable $A_M$, which is set to 1 if a candidate DTM is selected in the end and set to 0 otherwise. The assignment variables may guarantee each network cut is represented by at least one of its candidates DTMs, and filtering module 206 may minimize the number of selected DTMs minimizing the sum of the assignment variables.

$$\min \sum_{M \in T} A_M$$

$$\text{s.t.} \sum_{M \in D(c)} A_M \geq 1, \forall_C \in C$$

$$A_M \in \{0, 1\}, \forall M \in T$$

Filtering module 206 may achieve a low DTM count with a commercial ILP solver, such as FICO Xpress. In one example, a flow slack of approximately 1% can reduce the number of DTMS by over 75%, which corresponds to a substantial gain in terms of the computation needed for capacity planning. A further increase in the flow slack results in even more impressive results, though at the cost of hose coverage.

When generating traffic matrices, filtering module 206 may also evaluate an extent to which the entire hose space is covered. Filtering module 206 may define a metric to evaluate the degree to which our generated reference TMs cover the entire Hose space. In particular, since we use a two-stage process, where we sample the Hose space using a large number of TMs and further down-sample them to reach a smaller number of DTMs, it is desirable to measure the Hose coverage for each stage of the process.

As discussed above, the hose model is represented by a convex polytope P in a high-dimensional vector space, which is a natural way to measure the coverage of a set of samples S would be by volume, namely the volume of the convex hull containing all the samples divided by the volume of the hose space as follows.

$$\text{Coverage}(S, P) = \frac{\text{Volume}(\text{ConvexHull}(S))}{\text{Volume}(P)}$$

When applied to practical instances of network planning, however, this metric may become intractable. The complexity of computing a convex hull for V points in a L-dimensional space is approximately $O(V^{L/2})$. In our case, $V=N^2-N$ where N is the node count in the network, which can be a few hundred, and the sample size $V=|S|$ can be $10^5$.

Instead, filtering module 206 may establish the planar coverage of the hose space P by a set of samples S on a plane b as follows, where π(S, b) marks the projection of the samples in S on the plane b, and π(P, b) is the projection of the hose polytope P on b.

$$\text{PlanarCoverage}(S, P, b) = \frac{\text{Area}(\text{ConvexHull}(\prod(S, b)))}{\text{Area}(\prod(P, b))}$$

For a collection of planes B, we define the coverage of the Hose space P by a set of samples S to be the mean planar coverage of P by S across all the planes in B.

$$\overline{\text{Coverage}(S, P)} = \frac{1}{n}\sum_{i=1}^{n}\text{PlanarCoverage}(S, P, b_i)$$

The choice of these planes is helpful for picturing the high-dimensional hose space truthfully. These planes should characterize all the variables in the hose constraints and the variables should contribute equally to shaping the planes. Filtering module 206 may construct planes with the pairwise combinations of the variables with the hose-constraints. Each variable may be an off-diagonal coefficient of a valid TM or M, or a source-destination pair in the network.

Returning to FIG. 1, at step 130 one or more of the systems described herein may obtain physical network resources to implement a cross-layer network upgrade architecture that satisfies the tractable set of dominating traffic matrices. For example, at step 130, obtaining module 208 may facilitate the obtaining of physical network resources to implement an upgrade architecture for a cross-layer network, such as the network shown in FIG. 7, where the architecture satisfies the tractable set of dominating traffic matrices that was created at step 120. Generally speaking, the cross-layer network upgrade architecture may size a link across each graph cut of the cut sets, as discussed above. The term "cross-layer network upgrade architecture" may refer to any plan, design, or specification for upgrading network capacity according to steps 130 and 140.

Obtaining module 208 may perform step 130 in a variety of ways. The term "obtaining" may broadly refer to any action, command, or instruction to obtain, purchase, reserve, control, or request corresponding physical network resources. In alternative examples, obtaining module 208 may perform an action that simply facilitates the retrieval of such resources without actually and entirely retrieving them. In some examples, step 130 may be performed entirely by obtaining module 208, and in other examples, step 130 may be performed by a human administrator, team, automated or semi-automated device, and/or by coordination between one of these and obtaining module 208.

Generally speaking, the physical network resources may include fiber and/or equipment. Moreover, obtaining module 208 may ensure that the cross-layer network upgrade architecture satisfies the tractable set of dominating traffic matrices. This may further guarantee, according to a predefined probability threshold, that the cross-layer network upgrade architecture will also satisfy a remainder of the set of traffic matrices. In other words, satisfying the dominating traffic matrices may help ensure that the resulting network capacity plan also satisfies the remainder of the set of traffic matrices from which the dominating traffic matrices were selected by comparison with the cut sets.

In some examples, the cross-layer network upgrade architecture for which obtaining module 208 is obtaining resources may be generated according to a cost optimization model. The cost optimization model may optionally generate the cross-layer network upgrade architecture through integer linear programming. The cost optimization model may optionally account for one or more of fiber count, space and power, spectrum consumption on fiber, and/or maximum capacity constraints on leased waves. Additionally, or alternatively, the cost optimization model may account for cost of at least one or more of fiber procurement, optical or Internet protocol hardware, operational cost, space and power, and/or provisioning cost. Furthermore, the cost optimization model may satisfy a flow conservation constraint for all planned network failures and/or jointly optimize for all dominating traffic matrices.

Returning to FIG. 1, at step 140 one or more of the systems described herein may allocate the physical network resources across the multiple data centers according to the cross-layer network upgrade architecture such that a capacity level of the multiple data centers is increased while satisfying the data center constraint model. For example, at step 140, allocation module 210 may allocate the physical network resources across the multiple data centers shown in FIG. 7 according to the cross-layer network upgrade architecture referenced at step 130 such that a corresponding capacity level is increased while satisfying the data center constraint model generated at step 110.

Allocation module 210 may perform step 140 in a variety of ways. The phrase "allocate" may broadly refers to any action, command, or instruction that assigns or moves resources to implement the cross-layer network upgrade architecture. As with step 130, step 140 may be performed entirely by allocation module 210, and in other examples, step 140 may be performed by a human administrator, team, automated or semi-automated device, and/or by coordination between one of these and allocation module 210. Thus, allocation module 210 may simply instruct, coordinate, or organize the implementation of infrastructure according to the cross-layer network upgrade architecture such that the corresponding network capacity plan is implemented, and the data center constraint model is satisfied (e.g., because satisfying the tractable set of traffic matrices helps to ensure that the corresponding data center constraint model is also satisfied). Moreover, the term "satisfies" may refer to the cross-layer network upgrade architecture and/or network capacity plan providing sufficient capacity and/or network resources to accommodate or achieve traffic flows indicated by the tractable set of traffic matrices and despite one or more failures that may be specified by the design policy and corresponding network topology graph cut sets.

The above description provides an overview of method 100 shown in FIG. 1. Additionally, or alternatively, the following discussion provides a supplemental overview of concrete embodiments of the disclosed technology.

Modern technology companies often have a production backbone network that connects data centers and delivers the social network's content to the users. The network supports a vast number of different services, which are placed across a multitude of data centers. The traffic patterns shift over time from one data center to another due to changing placement requirements. As a result, there can be exponential and highly variable traffic demand growth. To meet service bandwidth expectations, it is desirable to have an accurate long-term demand forecast. However, due to the nature of the services, the fluidity of the workloads, and anticipation of future needs, identifying a precise forecast is nearly impossible. Thus, it is helpful for long-term network plans to account for traffic demand uncertainty.

This discussion covers the design methodology changes that can be made to absorb traffic uncertainty in network capacity upgrade planning. A classical approach to network planning is to size the topology to accommodate a given traffic matrix under a set of failures that are defined using a failure protection policy. In this approach: (i) the traffic matrix is the volume of the traffic that is forecast between any two data centers (pairwise demands), (ii) the failure protection policy is a set of commonly observed failures in the network such as singular fiber cuts, dual submarine link failures, or a set of failures that have been encountered multiple times, and (iii) a cost optimization model is used to calculate the network turn-up plan. Essentially, this refers to an integer linear programming (ILP) formulation that performs max-flow over each individual failure and ensures the capacity to admit the traffic matrix for each failure.

The following describes one or more problems to be solved. First, in terms of a lack of long-term fidelity, backbone network turn-up requires longer lead times, typically on the order of months. Even worse, this can include multiple years in the case of deciding on terrestrial fiber and submarine investments. Given past growth and the dynamic nature of such services, it can be challenging to forecast service behavior for a timeframe over six months. One related approach was to handle traffic uncertainties by dimensioning the network for worst-case assumptions and sizing for a higher percentile, say P95. Nevertheless, asking every service owner to provide a traffic estimate per data center pair is hardly manageable. With the classical approach, a service owner is requested to give an explicit demand spec. That is daunting because not only are there visible changes in current service behavior, but it is also unknown what new services will be introduced and will consume the network in a one-year or above timeframe. The problem of exact forecasting traffic is even more difficult in the long term because the upcoming data centers are not even in production when the forecast is requested.

Second, in terms of extracting the network as a resource, a service typically requires compute, storage, and network resources. Data centers get their shares of computing and storage resources allocated to them. The service owners then can analyze the short-term and long-term requirements for these as a consumable entity per data center. However, this is not true for the network because the network is a shared resource. It is desirable to create a planning method that can abstract the network's complexity and present it to services like any other consumable entity per data center.

Third, in terms of operational churn, tracking every service's traffic surge, identifying its root-cause, and tracking its potential impact is becoming increasingly difficult. Most of these surges are harmless because not all services surge simultaneously. Nonetheless, this still creates operational overhead for tracking many false alarms.

A solution to one or more of the above problems may be described as network hose-based planning. Instead of forecasting traffic for each (source, destination) pair, a traffic-forecast is calculated for total-egress and total-ingress traffic per data center, i.e., the "network-hose." Instead of asking the question "how much traffic a service would generate from X to Y," one may ask "how much ingress and egress traffic a service expects from X." Thus, the $O(N^2)$ data points per service may be replaced with $O(N)$. When planning for aggregated traffic, one may also naturally factor in statistical multiplexing into the forecast.

FIG. 4 reflects the change in input for the planning problem. Instead of a classical traffic matrix, potentially only hose-based traffic forecasts may be used as the basis to generate a network plan that supports the forecasts under all failures defined by the failure policy.

In terms of solving the planning challenge, while the "network-hose" model captures end-to-end demand uncertainty concisely, it may pose a different challenge: dealing with the infinitely many demand sets realizing the hose constraints. In other words, if one takes the convex polytope of all the demand sets that satisfy the hose constraint, it has a continuous space inside the polytope to deal with. Typically, this would be useful for an optimization problem as one may leverage linear programming techniques to solve this effectively. However, this model's key difference is that each point inside the convex polytope is a single traffic matrix. The long-term network build plan has to satisfy all such demand sets if one fulfills the hose constraint. This creates an enormous computational challenge as designing a cross-layer global production network is already an intensive optimization problem for a single demand set. The above reasons drive the need or desire to intelligently identify a few demand sets from this convex polytope that can serve as reference demand sets for the network design problem. In finding these reference demand sets, one may be interested in a few fundamental properties that should be satisfied: (i) these are the demand sets that are likely to drive the need for additional resources on the production network (e.g., fiber and equipment), such that if one designs the network explicitly for this subset, then one would further seek to guarantee with high probability that the remaining demand sets are covered, and (ii) the number of reference demand sets should be as small as possible to reduce the cross-layer network design problem's state-space.

To identify these reference demand sets, one may exploit the cuts in the topology and location (latitude, longitude) of the data centers to gain insights into the maximum flow that can cross a network cut. FIG. 10 shows a network cut in an example topology. This network cut partitions the topology into two sets for nodes (1, 2, 3, 4) and nodes (5, 6, 7, 8). To size the link on this network cut, one only needs one traffic matrix that generates maximum traffic over the graph cut. All other traffic matrices with lower or equal traffic over this cut get admitted with no additional bandwidth requirement over the graph-cut. Note that, in a topology with N nodes, one can create $2^N$ network cuts and have one traffic matrix per cut. However, the geographical nature of these cuts is essential, given the planar nature of the network topology. It turns out that simple cuts (typically a straight-line cut) are potentially more helpful to dimension the topology than more complicated cuts. As further shown in FIG. 10, a traffic matrix for each of the simple cuts is more meaningful than a traffic matrix for the "complicated" cuts due to the fact that a "complicated" cut is already taken into account by a set of simple cuts. By focusing on the simple cuts, one may reduce the number of reference demand sets to the smallest traffic matrix set. One may then solve these traffic matrices using a cost optimization model and produce a network plan supporting all possible traffic matrices. Based on simulations, one may observe that, given the nature of the network topology, additional capacity required for the hose-based traffic matrix is not significant but provides powerful simplicity in network planning and operational workflows. One may also potentially adopt the hose-based traffic characterization for dimensioning the production backbone network because it will enable one to simplify network planning and operations, and will help the services to interact with the network like any other consumable entity, i.e., just like power, computation, or storage.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

As explained above, this application discloses technology that may increase the ability of network capacity upgrade planners to efficiently plan upgrades to network capacity while additionally better handling uncertainty in the forecasting of future network traffic growth. The technology may generally achieve these benefits by applying a hose-based approach, rather than a pipe-based approach, to network planning, as discussed in more detail below. In particular, the technology may fundamentally base the plan for the network capacity upgrade on a constraint model that builds in uncertainty and, therefore, generates a multitude of different traffic matrices to be satisfied by the network capacity upgrade plan. The resulting plan will thereby be much more resilient and effective than conventional plans that are based upon a single network traffic matrix that was forecast to describe expected growth in network traffic. Such single network traffic matrices may be brittle and less effective at handling uncertainty.

EXAMPLE EMBODIMENTS

Example 1: A computer-implemented method for configuring networks may include (i) generating a data center constraint model by placing a constraint on a total amount of ingress or egress traffic a service expects from each respective data center of multiple data centers, (ii) filtering a set of traffic matrices that indicate points in the data center constraint model by comparing the set of traffic matrices against cut sets of a network topology that indicate network failures to create a tractable set of dominating traffic matrices, (iii) obtaining physical network resources to implement a cross-layer network upgrade architecture that satisfies the tractable set of dominating traffic matrices, and (iv) allocating the physical network resources across the multiple data centers according to the cross-layer network upgrade architecture such that a capacity level of the multiple data centers is increased while satisfying the data center constraint model.

Example 2: The method of Example 1, where the traffic matrices indicate a volume of traffic that is forecast between each pair of data centers in the multiple data centers.

Example 3: The method of any one or more of Examples 1-2, where the network failures include at least two of singular fiber cuts, dual submarine link failures, and/or repeated failures.

Example 4: The method of any one or more of Examples 1-3, where filtering the set of traffic matrices is performed through integer linear programming.

Example 5: The method of any one or more of Examples 1-4, where the data center constraint model indicates a convex polytope.

Example 6: The method of any one or more of Examples 1-5, where the physical network resources include fiber and equipment.

Example 7: The method of any one or more of Examples 1-6, where filtering the set of traffic matrices selects traffic matrices that are predicted to drive requirements for the physical network resources.

Example 8: The method of any one or more of Examples 1-7, where ensuring that the cross-layer network upgrade architecture satisfies the tractable set of dominating traffic matrices guarantees, according to a predefined probability threshold, that the cross-layer network upgrade architecture will also satisfy a remainder of the set of traffic matrices.

Example 9: The method of any one or more of Examples 1-8, where a number of traffic matrices in the tractable set of dominating traffic matrices is minimized.

Example 10: The method of any one or more of Examples 1-9, where comparing the set of traffic matrices against the cut sets of the network topology that indicate network failures includes selecting a set of traffic matrices that generates a maximum level of traffic over each graph cut of the cut sets.

Example 11: The method of any one or more of Examples 1-10, where generating the cross-layer network upgrade architecture includes sizing a link across each graph cut of the cut sets.

Example 12: The method of any one or more of Examples 1-11, where each graph cut of the cut sets forms a substantially straight line.

Example 13: The method of any one or more of Examples 1-12, where each graph cut of the cut sets forms a straight line.

Example 14: The method of any one or more of Examples 1-13, where generating the cross-layer network upgrade architecture is performed according to a cost optimization model.

Example 15: The method of any one or more of Examples 1-14, where the cost optimization model generates the cross-layer network upgrade architecture through integer linear programming.

Example 16: The method of any one or more of Examples 1-15, where the cost optimization model accounts for physical constraints in terms of at least three of: fiber count, space and power, spectrum consumption on fiber, or maximum capacity constraints on leased waves.

Example 17: The method of any one or more of Examples 1-16, where the cost optimization model accounts for cost of at least three of: fiber procurement, optical or Internet Protocol hardware, operational cost, space and power, or provisioning cost.

Example 18: The method of any one or more of Examples 1-17, where the cross-layer network upgrade architecture is generated according to a hose-based computation rather than a pipe-based computation.

Example 19: A corresponding system may include (i) a generation module, stored in memory, that generates a data center constraint model by placing a constraint on a total amount of ingress or egress traffic a service expects from each respective data center of multiple data centers, (ii) a filtering module, stored in memory, that filters a set of traffic matrices that indicate points in the data center constraint model by comparing the set of traffic matrices against cut sets of a network topology that indicate network failures to create a tractable set of dominating traffic matrices, (iii) an obtaining module, stored in memory, that facilitates the obtaining of physical network resources to implement a cross-layer network upgrade architecture that satisfies the tractable set of dominating traffic matrices, (iv) an allocation module, stored in memory, that allocates the physical network resources across the multiple data centers according to the cross-layer network upgrade architecture such that a capacity level of the multiple data centers is increased while satisfying the data center constraint model, and (v) at least one physical processor configured to execute the generation module, the filtering module, the obtaining module, and the allocation module.

Example 20: A corresponding non-transitory computer-readable medium may include one or more computer-readable instructions that, when executed by at least one processor of a computing device, cause the computing device to: (i) generate a data center constraint model by placing a constraint on a total amount of ingress or egress traffic a service expects from each respective data center of multiple data centers, (ii) filter a set of traffic matrices that indicate points in the data center constraint model by comparing the set of traffic matrices against cut sets of a network topology that indicate network failures to create a tractable set of dominating traffic matrices, (iii) facilitate the obtaining of physical network resources to implement a cross-layer network upgrade architecture that satisfies the tractable set of dominating traffic matrices, and (iv) allocate the physical network resources across the multiple data centers according to the cross-layer network upgrade architecture such that a capacity level of the multiple data centers is increased while satisfying the data center constraint model.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   generating a data center constraint model by placing a constraint on a total amount of ingress or egress traffic a service expects from each respective data center of multiple data centers;
   filtering a set of traffic matrices that indicate points in the data center constraint model by comparing the set of traffic matrices against cut sets of a network topology that indicate network failures to create a tractable set of dominating traffic matrices;
   obtaining physical network resources to implement a cross-layer network upgrade architecture that satisfies the tractable set of dominating traffic matrices; and
   allocating the physical network resources across the multiple data centers according to the cross-layer network upgrade architecture such that a capacity level of the multiple data centers is increased while satisfying the data center constraint model.

2. The computer-implemented method of claim 1, wherein the traffic matrices indicate a volume of traffic that is forecast between each pair of data centers in the multiple data centers.

3. The computer-implemented method of claim 1, wherein the network failures comprise at least two of singular fiber cuts, dual submarine link failures, and repeated failures.

4. The computer-implemented method of claim 1, wherein filtering the set of traffic matrices is performed through integer linear programming.

5. The computer-implemented method of claim 1, wherein the data center constraint model indicates a convex polytope.

6. The computer-implemented method of claim 1, wherein the physical network resources comprise fiber and equipment.

7. The computer-implemented method of claim 1, wherein filtering the set of traffic matrices selects traffic matrices that are predicted to drive requirements for the physical network resources.

8. The computer-implemented method of claim 1, wherein ensuring that the cross-layer network upgrade architecture satisfies the tractable set of dominating traffic matrices guarantees, according to a predefined probability threshold, that the cross-layer network upgrade architecture will also satisfy a remainder of the set of traffic matrices.

9. The computer-implemented method of claim 1, wherein a number of traffic matrices in the tractable set of dominating traffic matrices is minimized.

10. The computer-implemented method of claim 1, wherein comparing the set of traffic matrices against the cut sets of the network topology that indicate network failures comprises selecting a set of traffic matrices that generates a maximum level of traffic over each graph cut of the cut sets.

11. The computer-implemented method of claim 1, wherein generating the cross-layer network upgrade architecture comprises sizing a link across each graph cut of the cut sets.

12. The computer-implemented method of claim 11, wherein each graph cut of the cut sets forms a substantially straight line.

13. The computer-implemented method of claim 12, wherein each graph cut of the cut sets forms a straight line.

14. The computer-implemented method of claim 1, wherein generating the cross-layer network upgrade architecture is performed according to a cost optimization model.

15. The computer-implemented method of claim 14, wherein the cost optimization model generates the cross-layer network upgrade architecture through integer linear programming.

16. The computer-implemented method of claim 14, wherein the cost optimization model accounts for physical constraints in terms of at least three of:
   fiber count;
   space and power;
   spectrum consumption on fiber; or
   maximum capacity constraints on leased waves.

17. The computer-implemented method of claim 14, wherein the cost optimization model accounts for cost of at least three of:
   fiber procurement;
   optical or Internet Protocol hardware;
   operational cost;
   space and power; or
   provisioning cost.

18. The computer implemented method of claim 1, wherein the cross-layer network upgrade architecture is generated according to a hose-based computation rather than a pipe-based computation.

19. A system comprising:
   a processor; and
   a memory comprising instructions that, when executed, cause the processor to:
   generate a data center constraint model by placing a constraint on a total amount of ingress or egress traffic a service expects from each respective data center of multiple data centers;
   filter a set of traffic matrices that indicate points in the data center constraint model by comparing the set of traffic matrices against cut sets of a network topology that indicate network failures to create a tractable set of dominating traffic matrices;
   facilitate the obtaining of physical network resources to implement a cross-layer network upgrade architecture that satisfies the tractable set of dominating traffic matrices; and
   allocate the physical network resources across the multiple data centers according to the cross-layer network upgrade architecture such that a capacity level of the multiple data centers is increased while satisfying the data center constraint model.

20. A non-transitory computer-readable medium comprising instructions that, when executed, cause a computing device to:
   generate a data center constraint model by placing a constraint on a total amount of ingress or egress traffic a service expects from each respective data center of multiple data centers;
   filter a set of traffic matrices that indicate points in the data center constraint model by comparing the set of traffic matrices against cut sets of a network topology that indicate network failures to create a tractable set of dominating traffic matrices;
   facilitate the obtaining of physical network resources to implement a cross-layer network upgrade architecture that satisfies the tractable set of dominating traffic matrices; and
   allocate the physical network resources across the multiple data centers according to the cross-layer network upgrade architecture such that a capacity level of the multiple data centers is increased while satisfying the data center constraint model.

* * * * *